Figures 1, 2:
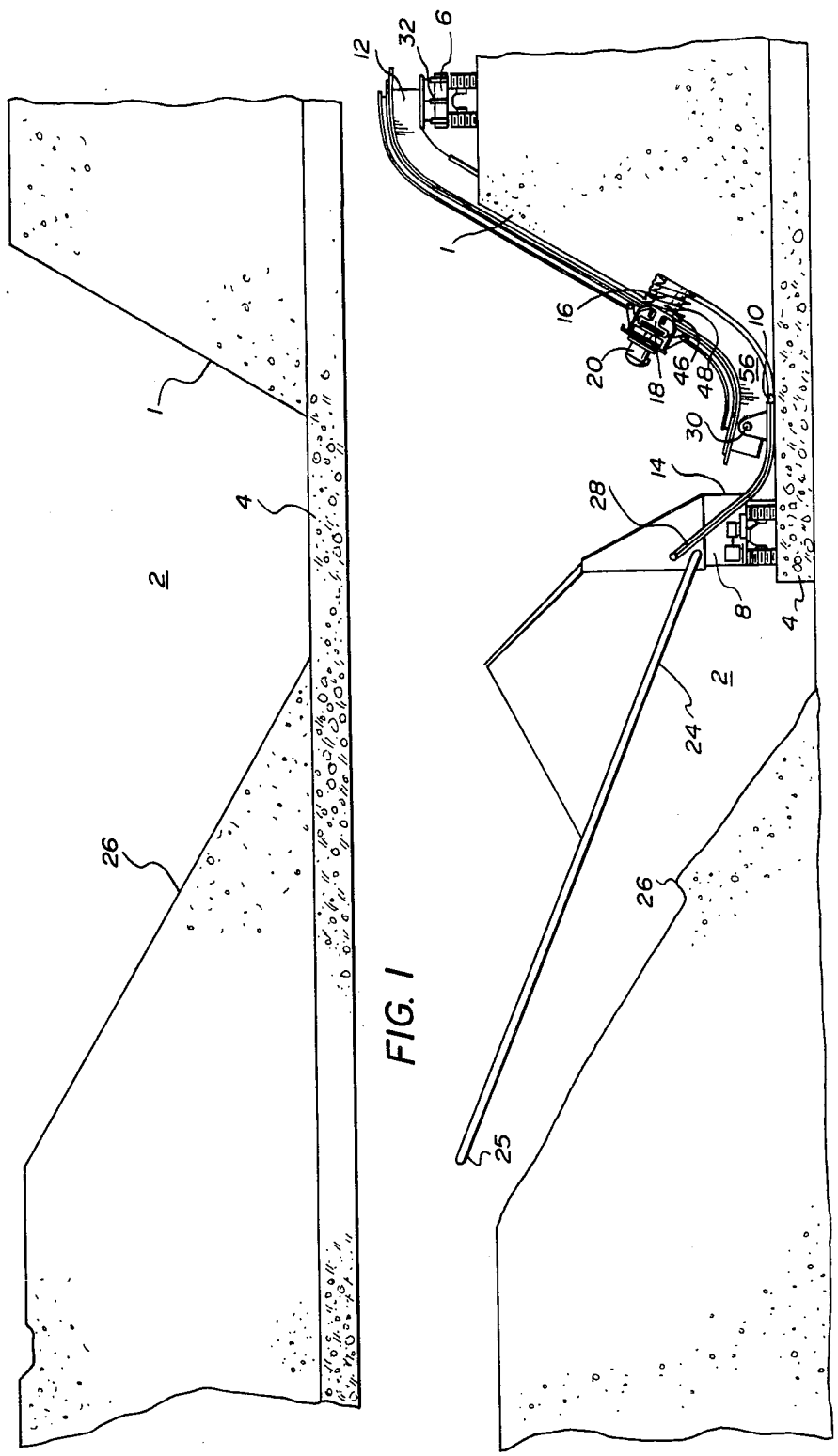

United States Patent [19]

Owen et al.

[11] 4,183,586
[45] Jan. 15, 1980

[54] APPARATUS FOR PROGESSIVELY REMOVING LAYERS OF OVERBURDEN FROM AN INCLINED SIDE OF A CUT

[75] Inventors: Howard D. Owen, Glamorgan, Wales; Terence Smith, Edmonton, Canada

[73] Assignee: The Research Council of Alberta, Edmonton, Canada

[21] Appl. No.: 939,809

[22] Filed: Sep. 5, 1978

[30] Foreign Application Priority Data

Jan. 27, 1978 [CA] Canada .................................. 295800

[51] Int. Cl.² ........................ E21C 35/20; E21C 47/00
[52] U.S. Cl. ......................................... 299/43; 299/18
[58] Field of Search ...................... 299/18, 34, 43–46, 299/87

[56] References Cited

U.S. PATENT DOCUMENTS

| 3,085,795 | 4/1963 | Snipe et al. ............................. 299/87 |
| 4,038,764 | 8/1976 | Hanson ............................... 299/34 X |
| 4,084,854 | 4/1978 | Peterson ............................. 299/87 X |
| 4,108,496 | 8/1978 | Schneidersmann ..................... 299/45 |

FOREIGN PATENT DOCUMENTS 2513626  1/1976  Fed. Rep. of Germany ............. 299/18

Primary Examiner—Ernest R. Purser
Attorney, Agent, or Firm—Francis W. Lemon

[57] ABSTRACT

Layers of overburden are progressively removed from one inclined side of a cut by a rotating cutter and deposited on the other side of the cut in substantially the same geological sequence by traversing the cutter along an arm sloping along the inclined side, conveying the removed overburden by the arm to the bottom of the cut, and depositing the overburden by an adjustable endless belt on the opposite sloping side. The arm is moved along the sloping side by self-propelled transport units at the top and bottom of that sloping side.

2 Claims, 5 Drawing Figures

APPARATUS FOR PROGESSIVELY REMOVING LAYERS OF OVERBURDEN FROM AN INCLINED SIDE OF A CUT This invention relates to an apparatus for progressively removing layers of overburden from an inclined side of a cut.

The removal and discard of overburden in many surface mines is achieved by the use of dragline equipment. This equipment has not changed in concept since the early 1900's. The machines have been enlarged and improved but the techniques employed have changed little.

As described in for example U.S. Pat. No. 2,291,669, dated Aug. 4, 1942, "Method of strip mining", R.S. Weimer et al, the dragline is basically a large boom mounted on a rotating member attached to a mobile base, suspended from the boom and controlled by wire ropes is a scoop type loading bucket. The overburden is removed by dragging the bucket through the overburden from the bottom to the top, raising the bucket above base level, swinging the machine so that the bucket is in the spoil pile area, dumping the bucket load and returning the bucket to the bottom of the overburden pile. The sequence is then repeated. The disadvantages of this system are:

(a) It is cyclic in operation.
(b) It employs sophisticated control circuitry aboard the machine to control a large number of prime movers.
(c) It requires large horse power for the hoist and swing motions.
(d) Because it has a number of large horse power machines operating in a cyclic mode, it has a considerable effect on the incoming power supply system, and requires a large reserve of available power to prevent erratic swings in supply voltage.
(e) It cannot readily clearly expose the top surface of the coal seam, other machines perform that function.
(f) It cannot dump overburden in other than separate piles which require considerable effort to profile into an acceptable shape for reclamation.
(g) It cannot selectively mine the overburden satisfactorily and therefore makes reclamation of disturbed lands difficult.
(h) The basic design of each individual machine imposes limits on its usefulness with regard to the depth of overburden that can be removed.
(i) The machine design imposes limits on the economic recovery of available resources.

There is a need for a machine which:
(a) Is relatively mechanically simple.
(b) Has flexibility to adapt to changes in mining conditions.
(c) Can selectively mine seams of coal of varying thickness and location that may appear within the depth of overburden being mined.
(d) Has a much reduced horse power requirement when compared to an equivalent size dragline.
(e) Operates in a less cyclic manner.
(f) Will replace the overburden in the same geologic sequence in the spoil pile as it is in the natural overburden.
(g) Will leave a spoil pile that can be readily shaped to a suitable profile for reclamation.
(h) Make available for surface mining, coal which is presently considered uneconomic to recover with existing surface mining techniques.

According to the present invention there is provided an apparatus for progressively removing layers of overburden from one inclined side of a cut to make adjacent strips of a mineral seam progressively accessible during strip mining, comprising:

(a) a self-propelled top support and transport unit for placement at the top of the inclined side of the overburden from which layers are to be progressively removed and for movement along overburden adjacent to the inclined side,
(b) a self-propelled bottom support and transport unit for placement at the bottom of the inclined side of the overburden from which layers are to be progressively removed and for movement along and adjacent to the bottom of that inclined side,
(c) a cutter support and removed overburden conveying means, for attachment at an upper end to the self-propelled top support and transport unit and at a lower end to the self-propelled bottom support and transport unit, and for extending upwardly along the inclined side of the overburden from which layers are to be progressively removed, and for conveying removed overburden to the bottom of the cut,
(d) an overburden cutter,
(e) mounting means moveable along the cutter support and removed overburden conveying means, the mounting means rotatably mounting the cutter for rotation about an axis which is substantially at right angles to the plane, of the inclined side of the cut, from which overburden is to be removed,
(f) driving means for driving the cutter to cut overburden and convey the cut overburden to the cutter support and overburden conveying means,
(g) moving means for moving the mounting means in either direction along the cutter support and overburden conveying means, and
(h) a distribution conveyor, with an adjustable discharge end, attached to the bottom support and transport unit for conveying removed overburden therefrom and depositing the removed overburden, in substantially the same geological sequence to that in which it was mined, on the opposite inclined side of the cut to that from which it was removed, wherein the improvement comprises
(i) the cutter support and overburden conveying means comprises an I-shaped beam, and the mounting means moveable along the cutter support and removed overburden conveying means rotatably mounts the cutter for the cut overburden to be deposited on a lower flange of the I-shaped beam.

Figure 3:
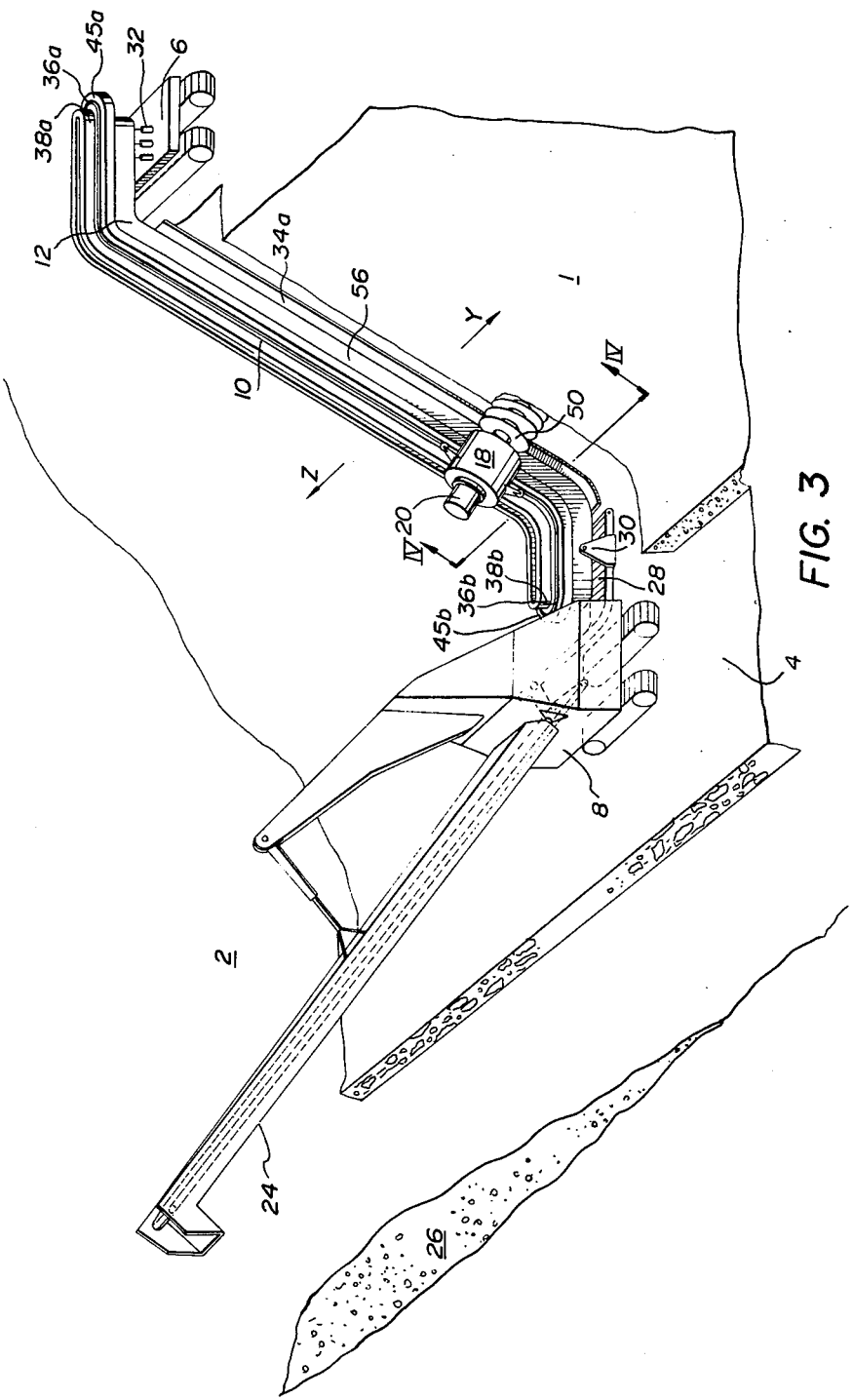
Figure 4:
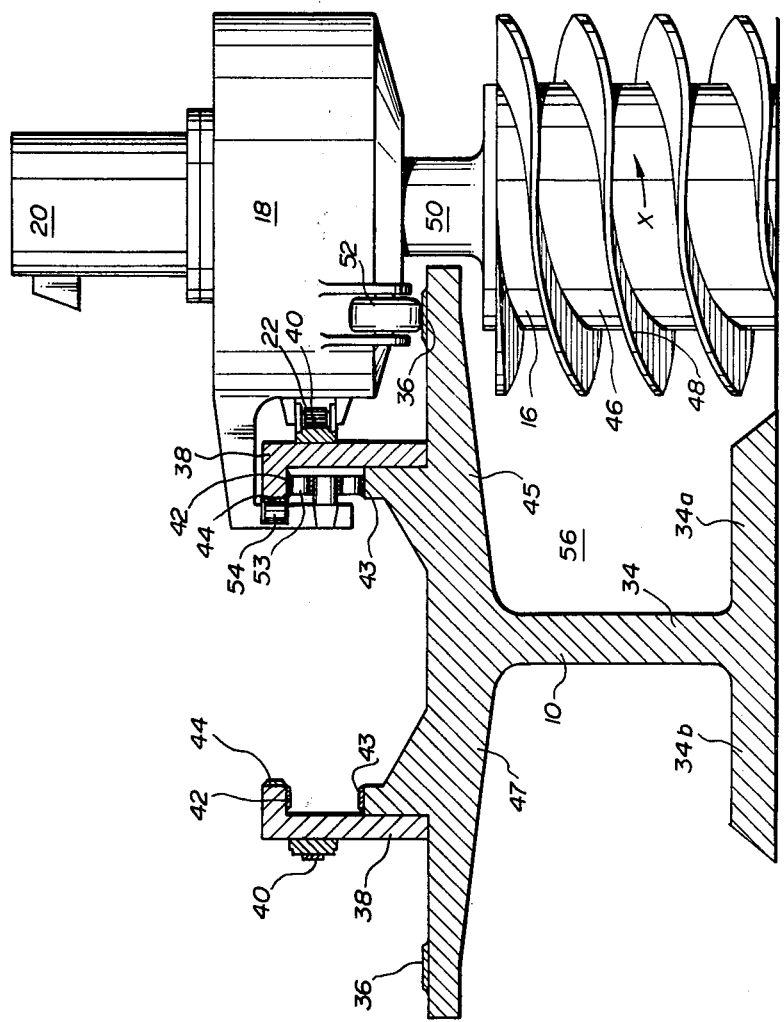
Figure 5:
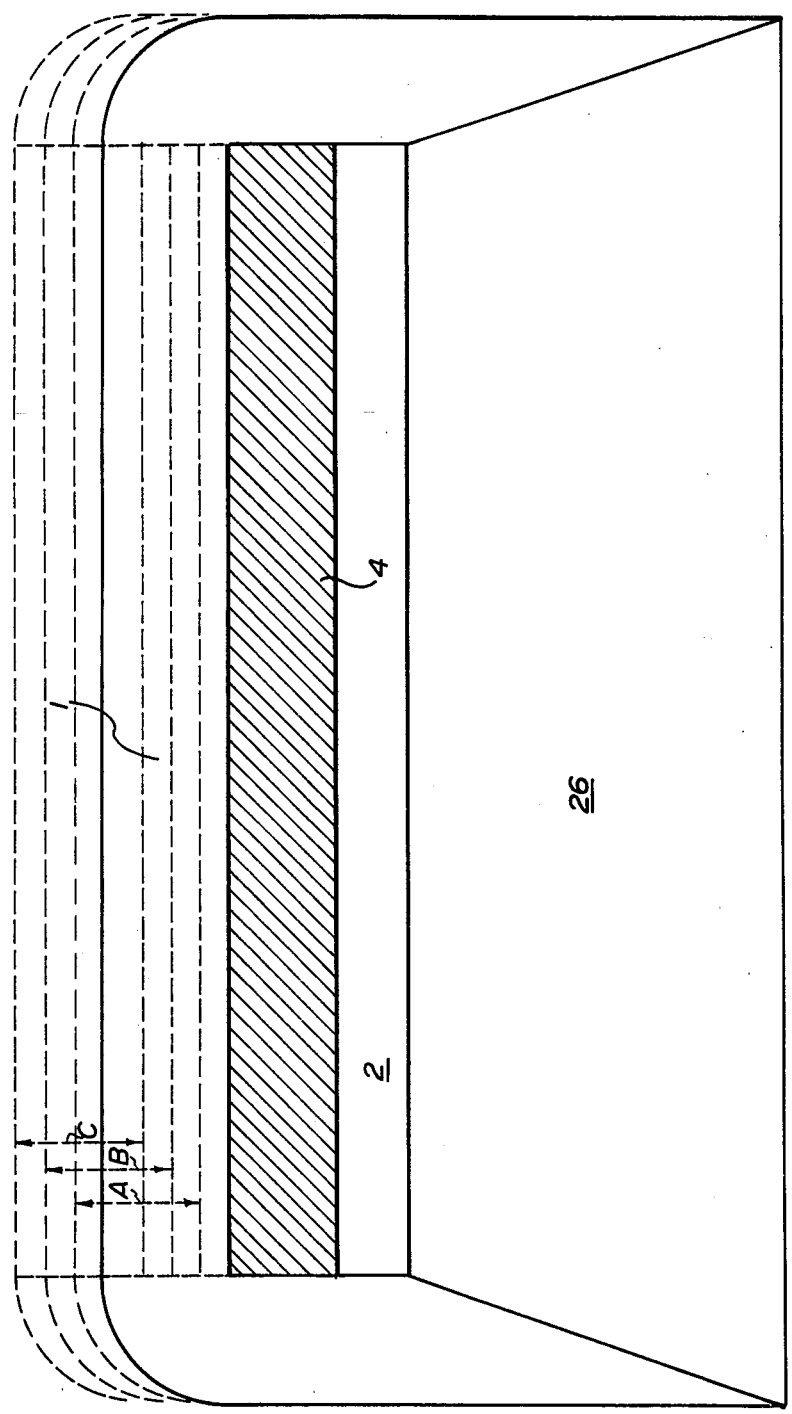

In the accompanying drawings which illustrate, by way of example, an embodiment of the present invention:

FIG. 1 is a cross-sectional side view of an initial cut showing the inclined sides, FIG. 2 is a similar view to FIG. 1 but with an apparatus shown progressively removing overburden from one inclined side of a cut, FIG. 3 is a perspective view of FIG. 2, and FIG. 4 is an enlarged, sectional view along IV—IV, FIG. 3, and FIG. 5 is a plan view of the cut shown in FIG. 1 and shows how the apparatus shown in FIGS. 2 to 4 can be used so that unproductive travel time of the apparatus at the end of removing each layer can be minimized.

Referring to FIGS. 1 to 4 there is shown an apparatus for progressively removing layers of overburden from one side 1 of a cut 2 to make adjacent strips of a mineral seam 4, in this instance a coal seam, progressively accessible during strip mining, comprising:

(a) a self-propelled top support and transport unit 6 for placement at the top of the inclined side 1 of the overburden from which layers are to be progressively removed, and for movement along overburden adjacent to the inclined side 1, (b) a self-propelled bottom support and transport unit 8 for placement at the bottom of the inclined side 1 of the overburden from which layers are to be progressively removed and for movement along and adjacent to the bottom of that inclined side 1, (c) a cutter support and removed overburden conveying means 10, for attachment at an upper end 12 to the self-propelled top support and transport unit 6 and at a lower end 14 to the self-propelled bottom support and transport unit 8, and for extending upwardly along the inclined side 1 of the overburden from which layers are to be progressively removed, and for conveying removed overburden to the bottom of the cut 2, (d) an overburden cutter 16, (e) mounting means 18, in this embodiment in the form of a gear box, moveable along the cutter support and removed overburden conveying means, the mounting means 18 rotatably mounting the cutter 16 for rotation substantially at right angles to the plane of the inclined side 1, of the cut 2, from which overburden is to be removed, (f) driving means 20, in this embodiment an electrical motor, for driving the cutter 16 to cut overburden and convey the cut overburden (not shown) to the cutter support and overburden conveying means 10, (g) moving means 22 for moving the mounting means 18 in either direction along the cutter support and overburden conveying means 10, and (h) a distribution conveyor 24 with an adjustable discharge end 25 attached to the bottom support and transport unit 8 for conveying removed overburden (not shown) therefrom and depositing the removed overburden, in substantially the same geologic sequence to that in which it was mined, on the opposite inclined side 26 of the cut 2 to that from which it was removed, and wherein the improvement comprises (i) the cutter support and overburden conveying means 10 comprises an I-shaped beam 34, and the mounting means 18 moveable along the cutter support and removed overburden conveying means 10 rotatably mounts the cutter 16 for the cut overburden to be deposited on a lower flange 34a or 34b of the I-shaped beam 34.

The self-propelled top and bottom support and transport units 6 and 8 in this embodiment have crawler track traction systems but in other embodiments may, for example, be provided with pneumatic tires or walking shoes.

The self-propelled top and bottom support and transport units 6 and 8 in this embodiment are each powered by conventional electrical equipment (not shown) mounted on board and are synchronized in a conventional manner (not shown) to move together by one operator, who may be on board one of the units 6 or 8. In other embodiments the self-propelled top and bottom support and transport units 6 and 8 may each be powered by equipment travelling alongside, both power equipments may be synchronized by a conventional electrical control system to move together, and may, for example, be diesel engines.

Preferably an intermediate conveyor 28 is provided on the self-propelled bottom support 8 for conveying removed overburden (not shown) from the cutter support and removed overburden conveying means 10 to the distribution conveyor 24.

The cutter support and removed overburden conveying means 10 in this embodiment is pivotally attached by pivot 30 to the self-propelled bottom support 8 and is adjustably supported by hydraulic rams 32 on the self-propelled top support 6 in order that the cutter support and removed overburden conveying means 10 can be adjusted to suit the contour of the inclined side 1.

The cutter support and removed overburden conveying means 10 comprises in this embodiment in addition to the I-shaped beam 34 with co-extending lower flanges 34a and 34b (FIG. 4), a machined bearing surface 36, and an angle member 38, attached thereto and extending therealong. The angle member 38 has a rack 40 extending along one side and machined bearing surfaces 42 to 44 at right angles to each other and extending along the other side of the angle member. As shown in FIGS. 3 and 4 the machined bearing surface 36 and angle member 38 extend along both upper flanges 45 and 47 of the I-shaped beam 34 and are joined by rounded ends 36a and 36b of the machined surface 36 and 38a and 38b of the angle member 38, where the upper flanges 45 and 47 are joined by rounded portions 45a and 45b. The rack 40 extends around rounded end portions in the same manner.

In some embodiments of the present invention the cutter support and removed overburden conveying means 10 comprises three or more longitudinally extending parts that are bolted together so that the length of the cutter support and removed overburden conveying means 10 can be made to suit cuts of different depths.

The overburden cutter 16 comprises a drum 46 with a plurality of cutting picks 48 attached to the drum 46 and arranged to form a helix around the drum 46. The overburden cutter 16 has a driving shaft 50.

The overburden cutter 16 may, in other embodiments of the present invention, for example, comprise a system of picks displaced around and carried round on an endless chain conveying system or a plough system or any combination of the three systems described. The material may be conveyed from the position where it is cut to the cutter support and overburden conveying means 10 by the impact of mechanical picks, by hydraulic means with pressurised fluid or by pneumatic means with pressurised air flow.

The mounting means 18 comprises a gear box drivingly coupled to and supporting the driving shaft 50. The mounting means 18 is provided with three rollers 52 to 54 supporting the mounting means 18 on the machined bearing surfaces 36, 42 to 44.

The driving means 20 is mounted on the mounting means 18 and is coupled to gears (not shown) therein to drive the driving shaft 50. Power for the driving means 20 may be provided by, for example, a flexible cable or fully shrouded sliding contact arrangement.

In other embodiments the drive means may be motivated hydraulically or by compressed air.

The moving means 22 is a pinion meshing with the rack 40 and driven by the driving means 20.

In other embodiments of the present invention the moving means 22 may, for example, be any other mechanical system or a hydraulic system, such as a chain or other haulage device. The rate of advance of the overburden cutter 16 is preferably controlled by, for example, a slipping clutch or hydraulically (not shown) in the moving means to ensure that an overload is not imposed on the overburden cutter 16.

The distribution conveyor 24 is capable of depositing removed overburden from the bottom to the top of the side 26 (FIGS. 1 to 3) and is preferably tiltably attached to the self-propelled bottom support and transport unit 8 in order to be capable of adjustment to suit the incline of the side 26.

In operation a cut 2 (FIGS. 1 to 3) is made in the overburden in a conventional manner to reveal a strip of the coal seam 4. The apparatus is then arranged in the cut 2 as shown in FIGS. 2 to 4. The driving means 20 is started up with the overburden cutter 16 at the bottom of the cut 2 and the overburden cutter 16 at the bottom of the cut 2 and the overburden cutter rotating in the direction X, FIG. 4. The distribution conveyor 24 is positioned to deposit overburden at the bottom of the side 26 and then the distribution conveyor 24 and the intermediate conveyor 28 are started.

As the overburden cutter 16 progresses up the inclined side 1, along the cutter support and removed overburden conveying means 10, by means of the pinion 22 and rack 40, overburden is cut from the side 1 by the overburden cutter 16 and the cut overburden (not shown) is deposited in the side 56 of the cutter support and removed overburden conveying means 10. The cut overburden then slides down the lower flange 34a (FIG. 4) of the cutter support and removed overburden conveying means 10 and is deposited upon the intermediate conveyor 28.

The cut overburden that is deposited on the intermediate conveyor 28 is conveyed thereby and deposited upon the variable discharge distribution conveyor which deposits the cut overburden on the side 26. As the overburden cutter progresses up the side 1, the variable discharge of distribution conveyor 24 similarly progresses up the side 26 with a suitable time lag, to deposit cut overburden in the same geologic sequence as it is being removed from the side 1. When the overburden cutter 16 reaches the top of the side 1 the direction of rotation of the pinion 22 is reversed, the variable discharge point of distribution 24 conveyor is retracted and the self-propelled top and bottom transport units 6 and 8 respectively, are driven to advance the cutter support and removed overburden conveying means 10 a cut width in the direction Y, FIG. 3. The cutting operation is then repeated. As the same time a strap of exposed coal is removed in a conventional manner behind the self-propelled bottom transport unit 8.

This sequence of operations is repeated along the entire length of the cut 2 mounting means 18 is used to bring the cutter 16 around one end of the cutter support and overburden conveying means 10 to be adjacent to one end of the lower flange 34b. The self-propelled top and bottom transport units 6 and 8 are used to move the apparatus step-by-step in the direction Z (FIG. 3) towards the other end of the cut 2 so that another layer of overburden is removed from the side 2 and deposited on the lower flange 34b, and a fresh strip of coal is exposed for removal.

At the end of the removal of a layer of overburden from the cut 2 the transport units 6 and 8 are preferably maneuvered to terminate the travelling in a cutting direction in a quadrant shape as shown in FIG. 5, where similar parts to those shown in FIGS. 1 to 4 are designated by the same reference numerals and the previous description is relied upon to describe them. Upon completion of movement in a quadrant shape the cutting unit travels around the top of the beam structure 34 and then the transport units 6 and 8 return through the quadrant so that the cutting unit can begin cutting another layer as previously described. This process is repeated at the end of each cut. In this manner unproductive travel time of the machine may be minimised.

The cutter support and removed overburden conveying means 10 may have a separate conveying system for any coal that may be cut by the overburden cutter 16 passing through a coal seam and may convey the coal separately from the overburden to a different location.

We claim:

1. Apparatus for progressively removing layers of overburden from one inclined side of a cut to make adjacent strips of a mineral seam progressively accessible during strip mining, comprising:
   (a) a self-propelled top support and transport unit for placement the top of the inclined side of the overburden from which layers are to be progressively removed and for movement along overburden adjacent to the inclined side,
   (b) a self-propelled bottom support and transport unit for placement at the bottom of the inclined side of the overburden from which layers are to be progressively removed and for movement along and adjacent to the bottom of that inclined side,
   (c) a cutter support and removed overburden conveying means, for attachment at an upper end to the self-propelled top support and transport unit and at a lower end to the self-propelled bottom support and transport unit, and for extending upwardly along the inclined side of the overburden from which layers are to be progressively removed, and for conveying removed overburden to the bottom of the cut,
   (d) an overburden cutter,
   (e) mounting means moveable along the cutter support and removed overburden conveying means, the mounting means rotatably mounting the cutter for rotation about an axis which is substantially at right angles to the plane, of the inclined side of the cut, from which overburden is to be removed,
   (f) driving means for driving the cutter to cut overburden and convey the cut overburden to the cutter support and overburden conveying means,
   (g) moving means for moving the mounting means in either direction along the cutter support and overburden conveying means, and
   (h) a distribution conveyor, with an adjustable discharge end, attached to the bottom support and transport unit for conveying removed overburden therefrom and depositing the removed overburden, in substantially the same geological sequence to that in which it was mined, on the opposite inclined side of the cut to that from which it was removed, and wherein the improvement comprises:
   (i) the cutter support and overburden conveying means comprises an I-shaped beam, and the mounting means moveable along the cutter support and removed overburden conveying means rotatably mounts the cutter for the cut overburden to be deposited on a lower flange of the I-shaped beam.

2. Apparatus according to claim 1, wherein the mounting means is moveable along both sides and around each end of the cutter support and removed overburden conveying means.

* * * * *